United States Patent
Torpey et al.

(10) Patent No.: US 6,753,976 B1
(45) Date of Patent: Jun. 22, 2004

(54) ADAPTIVE PIXEL MANAGEMENT USING OBJECT TYPE IDENTIFICATION

(75) Inventors: Peter A. Torpey, Webster, NY (US);
Virgil Joseph Hull, Fairport, NY (US);
Glenn K. Smith, Webster, NY (US);
Lesley P. Dudek, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/453,789

(22) Filed: Dec. 3, 1999

(51) Int. Cl.[7] .................................................. H04N 1/40
(52) U.S. Cl. ..................... 358/1.9; 358/2.1; 358/3.27; 382/176; 382/266
(58) Field of Search ..................... 358/1.9, 2.1, 3.27, 358/448, 453; 382/173, 176, 254, 266

(56) References Cited

U.S. PATENT DOCUMENTS

| | | | | |
|---|---|---|---|---|
| 4,272,771 A | | 6/1981 | Furukawa | 346/75 |
| 5,047,844 A | | 9/1991 | Ikeda et al. | 358/80 |
| 5,241,396 A | | 8/1993 | Harrington | 358/296 |
| 5,371,531 A | * | 12/1994 | Rezanka et al. | 347/43 |
| 5,371,610 A | | 12/1994 | Sugawa | 358/434 |
| 5,428,377 A | | 6/1995 | Stoffel et al. | 347/15 |
| 5,568,169 A | | 10/1996 | Dudek et al. | 347/43 |
| 5,570,118 A | | 10/1996 | Rezanka et al. | 347/43 |
| 5,579,446 A | | 11/1996 | Naik et al. | 395/109 |
| 5,592,311 A | | 1/1997 | Hibi | 358/518 |
| 5,614,931 A | | 3/1997 | Koike et al. | 347/43 |
| 5,635,967 A | | 6/1997 | Klassen | 347/43 |
| 5,704,021 A | | 12/1997 | Smith et al. | 395/109 |
| 5,717,448 A | | 2/1998 | Inada | 347/43 |
| 5,731,823 A | | 3/1998 | Miller et al. | 347/5 |
| 5,751,310 A | | 5/1998 | Yano et al. | 347/43 |
| 5,767,876 A | | 6/1998 | Koike et al. | 347/43 |
| 5,767,978 A | * | 6/1998 | Revankar et al. | 358/296 |
| 5,786,831 A | | 7/1998 | Fukushima et al. | 347/43 |
| 5,821,957 A | | 10/1998 | Berge et al. | 347/43 |
| 5,825,937 A | * | 10/1998 | Ohuchi et al. | 382/261 |
| 5,933,164 A | | 8/1999 | Sato et al. | 347/43 |
| 5,956,468 A | * | 9/1999 | Ancin | 358/1.9 |
| 6,183,062 B1 | | 2/2001 | Curtis et al. | 347/41 |

FOREIGN PATENT DOCUMENTS

| | | |
|---|---|---|
| EP | 0 100 811 A2 | 2/1984 |
| EP | 0 480 397 A2 | 4/1992 |
| EP | 0 580 449 A1 | 1/1994 |
| EP | 0 583 127 A2 | 2/1994 |
| EP | 0 595 650 A2 | 5/1994 |
| EP | 0 697 784 A1 | 2/1996 |
| EP | 0 709 214 A2 | 5/1996 |
| EP | 0 802 504 A2 | 10/1997 |

* cited by examiner

Primary Examiner—Thomas D. Lee
(74) Attorney, Agent, or Firm—William Elpert

(57) ABSTRACT

The present invention is directed to a method for differentially processing image types within a document image to enhance the quality of on an image on a receiving medium. In one aspect of the invention, the method begins by receiving document image data including one or more image regions. The method determines for each image region whether the region includes any image data corresponding to a first image type. The method then prints regions including image data corresponding to the first image type according to a first pixel management process and prints regions not including image data corresponding to the first image type according to a second pixel management process.

12 Claims, 16 Drawing Sheets

```
         CMYK  0,0,0,0  1,1,1,0  0,0,0,0  1,1,1,0  0,0,0,0  1,1,1,0  0,0,0,0  1,1,1,0  0,0,0,0 ┐
         1,1,1,0  1,1,1,0  0,0,0,0  1,1,1,0  0,0,0,0  1,1,1,0  0,0,0,0  1,1,1,0  0,0,0,0  1,1,1,0 ├ SCANLINE
    80 → 0,0,0,0  0,0,0,0  1,1,1,0  0,0,0,0  1,1,1,0  0,0,0,0  1,1,1,0  0,0,0,0  1,1,1,0  0,0,0,0 │
         1,1,1,0  1,1,1,0  0,0,0,0  1,1,1,0  0,0,0,0  1,1,1,0  0,0,0,0  1,1,1,0  0,0,0,0  1,1,1,0 │
         0,0,0,0
         ↑↑↑↑
          82
```

```
         CMYK
SCANLINE  1,0,0,1  0,0,0,1  0,0,0,1  0,0,0,1  0,0,0,1  0,1,0,1  0,0,0,1  0,0,0,1  0,0,0,1
          0,0,0,1  0,0,0,1  0,0,1,1  0,0,0,1  0,0,0,1  0,0,0,1  0,0,0,1  1,0,0,1  0,0,0,1
          0,1,0,1  0,0,0,1  0,0,0,1  0,0,0,1  0,0,0,1  0,0,1,1  0,0,0,1  0,0,0,1  0,0,0,1
          ↑
          80
```

FIG. 18

ADAPTIVE PIXEL MANAGEMENT USING OBJECT TYPE IDENTIFICATION

CROSS REFERENCE

Cross reference is made to the following related applications filed concurrently herewith: "Reduction Of Intercolor Bleeding In Liquid Ink Printing," Torpey et al., now U.S. Pat. No. 6,361,144 B1, "Maintaining Black Edge Quality In Liquid Ink Printing," Torpey et al., now U.S. Pat. No. 6,290,330 B1, "Identification Of Interfaces Between Black and Color Regions," Torpey et al., now U.S. Pat. 6,343,847 B1, "Reduction Of Intercolor Bleeding In Liquid Ink Printing," Smith et al., now U.S. Pat. No. 6,270,186 B1, and "Maintaining Edge Quality In Liquid Ink Printing," Curtis et al., now U.S. Pat. No. 6,183,062 B1.

BACKGROUND OF THE INVENTION

The present invention generally relates to liquid ink recording devices using two or more different color inks. More particularly, the present invention is directed to processing and printing composite documents comprising text objects, graphic objects and/or pictorial objects.

Liquid ink printers of the type often referred to as continuous stream or as drop-on-demand, such as piezoelectric, acoustic, phase change wax-based or thermal, employ at least one printhead from which droplets of ink are directed towards a recording sheet. Within the printhead, the ink is contained in a plurality of channels. Power pulses cause the droplets of ink to be expelled as required from orifices or nozzles at the end of the channels.

Liquid ink printers including ink jet printers deposit black and/or colored liquid inks which tend to spread when the ink is deposited on paper as a drop, spot, or dot. A problem of liquid ink printers is that the liquid inks used have a finite drying time, which tends to be somewhat longer than desired. Bleeding tends to occur when the drops are placed next to each other in a consecutive order or in a cluster of dots within a short time. Bleeding, spreading, and feathering causes print quality degradation including color shift, reduction in edge sharpness and solid area mottle which includes density variations in said areas due to puddling of inks. Intercolor bleeding occurs when ink from one color area blends into or bleeds with ink from another color area. Intercolor bleeding is often most pronounced where an area of black ink (relatively slow drying) adjoins an area of color ink (relatively fast drying); however, intercolor bleeding can occur at the interface between areas of any color inks having substantially different properties such as dry time or permeability.

Various methods have been proposed to increase edge sharpness and to reduce intercolor bleeding. Some of the proposed methods include replacing slow drying black ink with a process or composite black formed by combing fast drying color inks; under-printing a portion of the slow drying black ink with a color ink, use a fast drying black ink, and using both fast dry and slow dry black ink. While all of the proposed methods reduce intercolor bleeding to some degree, they all have one or more drawbacks that effect printer performance and/or image quality.

For example, using a fast dry ink in place of a slow drying black ink results in a reduced quality of black reproduction as current fast drying black inks have lower image quality than slow drying black inks. Additionally, fast drying black inks typically result in fuzzy edges in black areas next to non-printed areas. The use fast drying black ink at an interface and slow drying black ink for interior regions can eliminate lower image quality associated with fast drying black inks, but increases the cost and complexity of printer design by requiring a fifth ink in addition to the cyan, magenta, yellow and slow drying black ink. Similarly, replacing slow drying black ink with a process black (composite black) generated from fast drying color inks typically results in a reduced quality of black reproduction resulting in a lower image quality than the use of slow drying black ink. Additionally, the use of process black increases the amount of ink deposited on the print medium, increases dry time and increase the time to print a document. Furthermore, the use of additional ink may not be suitable for print medium such as transparencies and some types of paper which is not very absorbent. Under-printing a portion of the slow drying black ink with a color ink can be used to reduce intercolor bleeding; however, under-printing increases the amount of ink on the print medium. Moreover, printing color under black often results in the thickening or blurring of edges particularly along edges between printed and non-printed areas.

SUMMARY OF THE INVENTION

One aspect of the present invention is a method for processing document image data for printing an image on a receiving medium. The method includes receiving document image data, the image data comprising at least two elements from the group of text objects, graphic objects and pictorial objects; classifying each element in the image data as being one of a text object, a graphic object, or a pictorial object; printing the image data corresponding to elements classified as a text object according to a set of text processing parameters, the text processing parameters including processing text smaller than a text threshold size according to a set of small text processing parameters and processing text greater than the text threshold size according to a set of large text processing parameters; printing the image data corresponding to elements classified as a graphics object according to a set of graphics processing parameters; and printing the image data corresponding to elements classified as a pictorial object according to a set of pictorial processing parameters.

Another aspect of the present invention is a method for processing document image data to generate an image on a receiving medium. The method includes receiving image data comprising one or more image regions; determining for each image region whether the region includes any image data corresponding to a first image type; printing image regions including image data corresponding to the first image type according to a first pixel management process; and printing image regions not including image data corresponding to the first image type according to a second pixel management process.

BRIEF DESCRIPTION OF THE DRAWINGS

The following is a brief description of each drawing used to describe the present invention, and thus, are being presented for illustrative purposes only and should not be limitative to the scope of the present invention, wherein:

FIGS. 7–10 illustrate the bitmap patterns for each of the individual color planes for the composite bitmap pattern of FIG. 6;

FIG. 11 shows an exemplary bitmap pattern for implementing a thinning operation to eliminate all color pixels from every other composite pixel;

FIGS. 12–15 illustrate the bitmap patterns for each of the individual color planes for the composite bitmap pattern of FIG. 11;

FIG. 18 illustrates a composite bitmap pattern that may be used to under-print black pixels with color pixels;

DESCRIPTION OF THE PREFERRED EMBODIMENT

Figure 1:
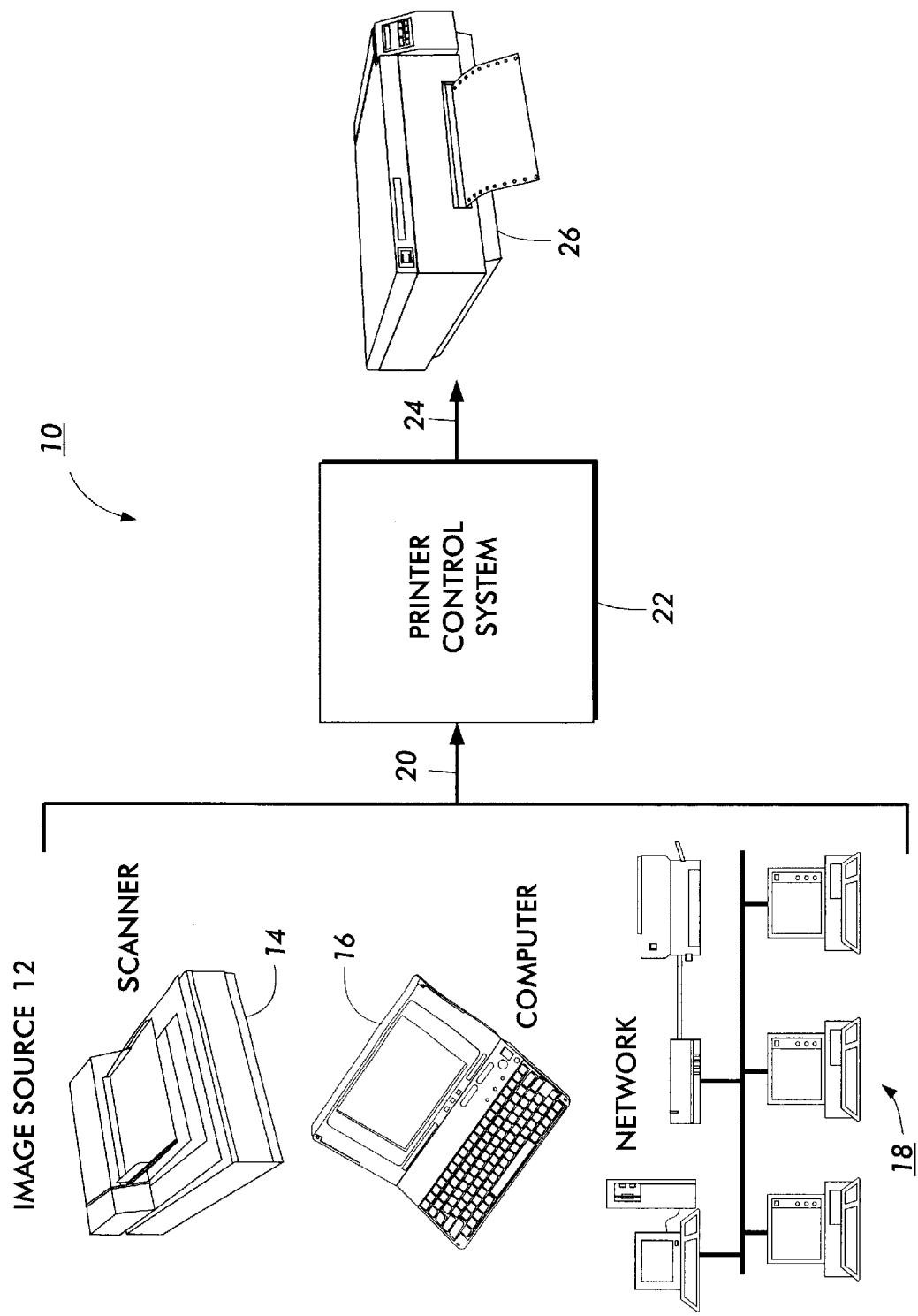
FIG. 1 is a general representation of a suitable system-level embodiment for one or more aspects of the present invention.

The following will be a detailed description of the drawings illustrated in the present invention. In this description, as well as in the drawings, like reference numbers represent like devices, circuits, or circuits performing equivalent functions.

Turning now to FIG. 1, there is shown an embodiment of an exemplary printing system 10 that incorporates the features of the present invention. Printing system 10 includes image source 12 that may include scanner 14, computer 16, network 18 or any similar or equivalent image input terminal providing image data 20 which may be any combination of ASCII data, bitmapped image, geometric data, graphics primitives, page description language, etc. Image data 20 is supplied to printer control system 22 which processes the received image data 20 to produce print data 24 that drives printer 26. Printer control system 22 may comprise what is commonly referred to in the art as a print driver. Those skilled in the art will recognize that control system 22 may be implemented in hardware and/or software and may reside within in image source 12, within printer 26, within a separate component or in any combination thereof. In response to print data 24, which may comprise image data and/or printer control signals (e.g., paper handling, carriage control, ink deposition), printer 26 generates an output image on a suitable print medium. Beneficially, printer 26 may comprise an ink jet printer.

Figure 24:
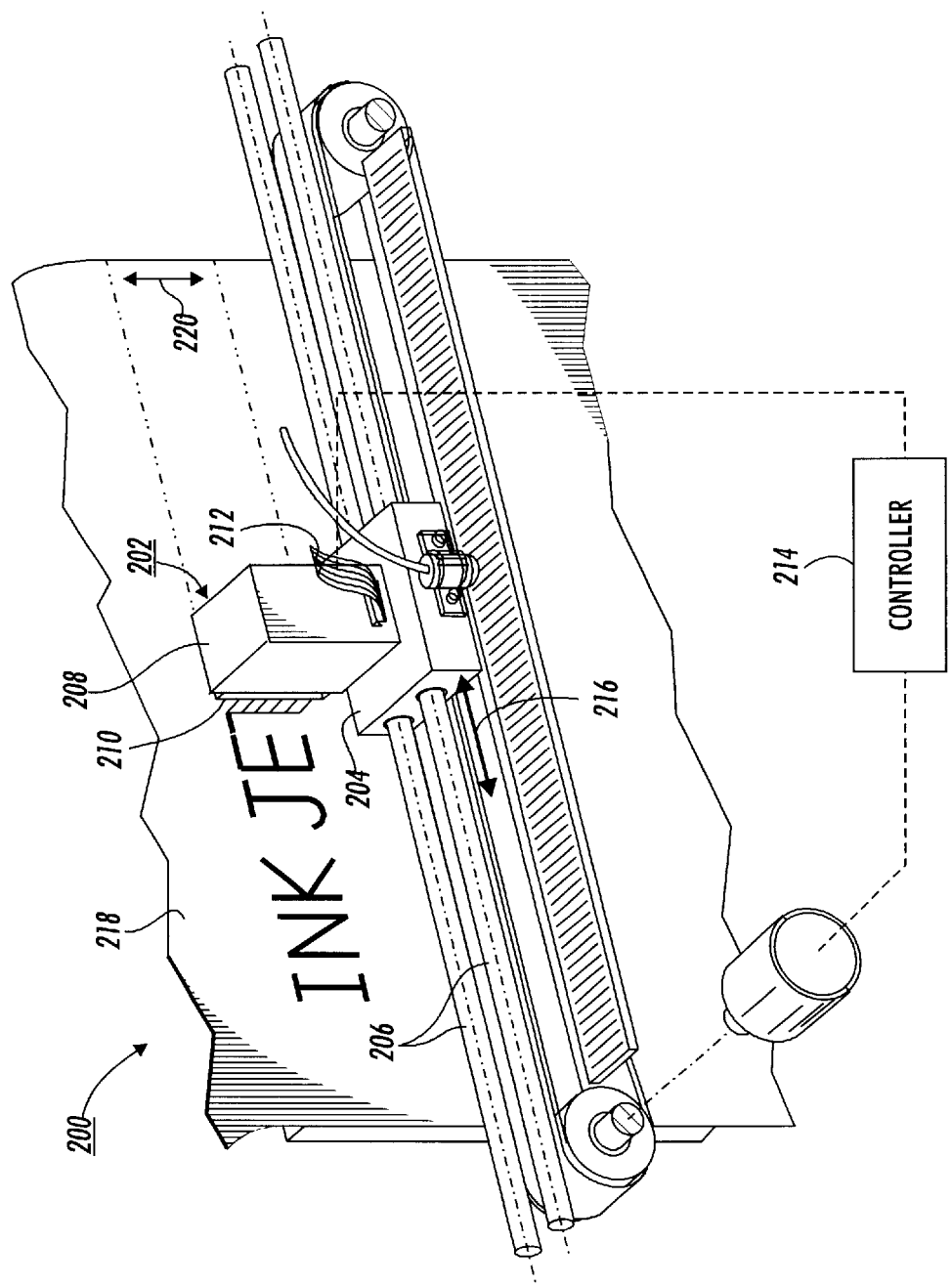
FIG. 24 is a partial schematic perspective view of an ink jet printer suitable for use with one or more aspects of the present invention.

Turning now to FIG. 24, there is shown a partial schematic perspective view of an ink jet printer 200 suitable for use in the system of FIG. 1. Printer 200 includes an ink jet printhead cartridge 202 mounted on carriage 204 supported by carriage rails 206. The printhead cartridge 202 includes housing 208 containing ink for supply to printhead 210 which selectively expels droplets of ink in response to control signals received from controller 214 through a communication cable 212. Printhead 210 contains a plurality of ink conduits or channels (not shown) which carry ink from housing 208 to respective ink ejectors, which eject ink through orifices or nozzles (also not shown). To effectuate printing, controller 214 is coupled to one or more printhead control circuits (not shown). The printhead control circuits receive information from controller 214 via control signals received through communication cable 212. In accordance with the content of the signals received, the control circuits provide for selected ejection of inks from the nozzles of printhead 210.

When printing, carriage 204 reciprocates or scans back and forth along carriage rails 206 in the directions of arrow 216. As the printhead cartridge 202 reciprocates back and forth across a recording medium 218, such as a sheet of paper or transparency, droplets of ink are expelled from selected ones of the printhead nozzles towards the recording medium. During each pass of carriage 204, the recording medium 218 is held in a stationary position. Upon the completion of one or more passes, the recording medium is advanced in the direction of arrow 220 by a feed mechanism under control of controller 214.

The present invention is directed towards aspects of printer control system 22 depicted in FIG. 1. In particular, the present invention is directed to a system and method for reducing intercolor bleeding that occurs at the interface between areas printed with inks having substantially different properties such as dry time or permeability. Bleeding of colors may occur at the interface between color areas and solid black areas and can lead to ragged edges and degraded print quality. As noted above, intercolor bleeding often occurs at the interface between black and color areas as many ink jet printers combine a slow-drying black ink with fast-drying color inks. Thus, in describing the present invention, reference will be made to intercolor bleeding occurring at black/color interfaces. However, it is noted that the invention is not limited to operating at black/color interfaces and may be adapted to reduce intercolor bleeding occurring at the interface between areas printed with color inks having substantially different properties. Furthermore, the present invention can be adapted to improve edge quality of black and/or color areas printed adjacent to a non-printed area.

The present invention is described as operating on color image data comprising two or more color planes or separations that are combined to form a composite image. Each color plane comprises a raster image describing the image for a color separation in terms of pixels arranged in scan-lines. For purposes of describing the present invention, reference will be made to image data comprising four color planes, Cyan, Magenta, Yellow and black (CMYK). Each composite pixel comprises four associated separation pixels, one for each of the CMYK color planes. Each separation pixel beneficially comprises a pixel value which may be considered as a binary signal indicating whether the corresponding separation is on or off, i.e., whether the corresponding ink will be deposited at that location or not. It will be appreciated that in a printer which can deposit multiple ink drops of a single color at a pixel location, a separation pixel may have multiple on states wherein each corresponds to depositing a different number of ink drops. Those skilled in the art will recognize that a different number of separations as well as different combinations of colors may be used in forming a composite image.

Figure 2:
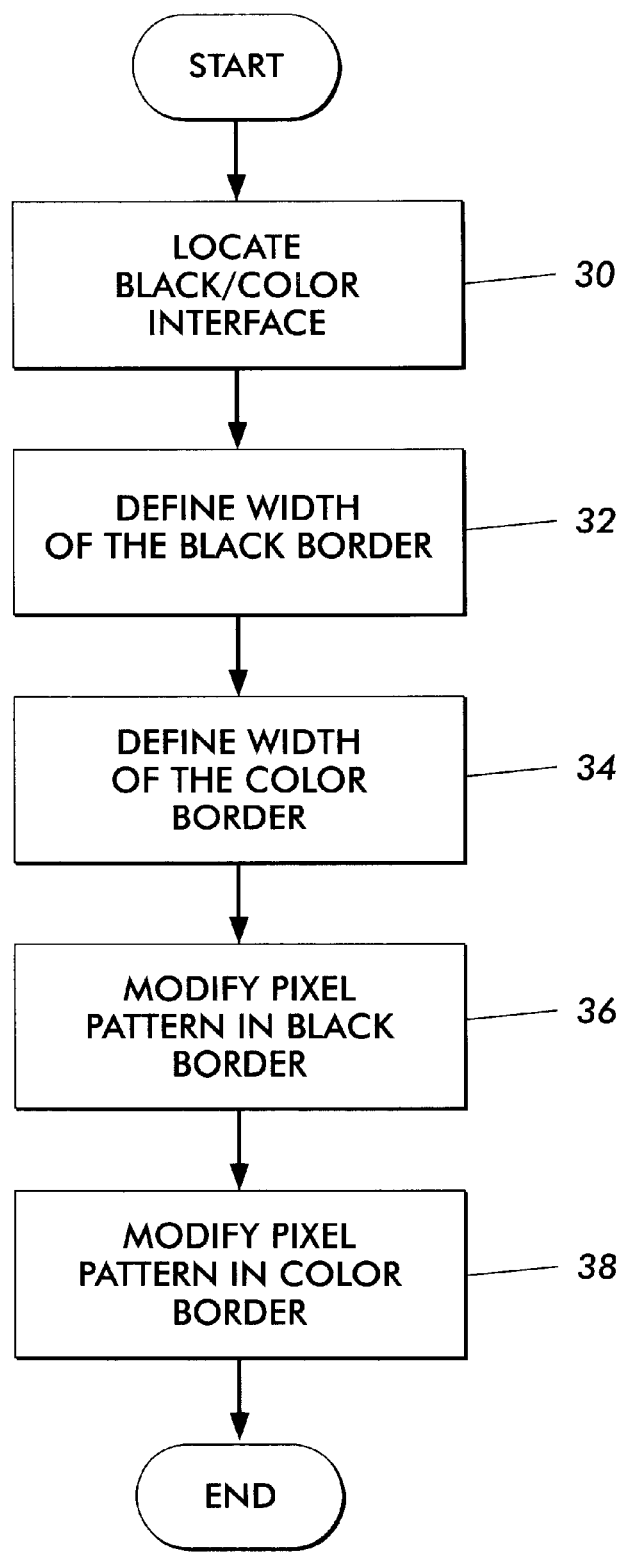
FIG. 2 is a diagram illustrating the steps of a process to reduce intercolor bleeding according to the concepts of the present invention.

To reduce intercolor bleeding, the present invention carries out a process that operates to detect black/color interfaces where intercolor bleeding is likely to occur and to modify the pixels that are to be printed near the borders of the interfaces The process comprises three general steps: identifying an interface between a black area and a color area; modifying the pixel pattern in a black border region in the black area; and modifying the pixel pattern in a color border region in the color area. Referring to FIG. 2, there is shown a flowchart illustrating this method for reducing intercolor bleeding in more detail.

Step 30 identifies an interface between a black area and a color area. In one embodiment, described in more detail below, step 30 collects statistics for pixels within a X×Y window filter to identify an interface and determine if a given pixel is within either border region. However, step 30 can use any number of known techniques including, but not limited to, masking, look-up tables, edge detection filters, etc. to identify a black/color interface. A discussion of edge detection filters can be found in U.S. Pat. No. 5,635,967.

Step 32 defines a width N of the black border region near the black/color interface identified in step 30. The number of pixels N comprising the black border region should be large enough to reduce intercolor bleeding at the border and small enough to minimize the formation of additional printing artifacts that would likewise reduce image quality. Similarly, step 34 defines the width M of the color border region near the interface. As with the selection of black border region, the width M of the color border region should be selected to reduce intercolor bleeding while minimizing the addition of other printing artifacts.

When defining the width of the border regions consideration may be given to such factors as the position of the border regions, the type of image (e.g., text, line art, graphics, pictorial, etc.), the width of each border, how the pixel pattern within a border will be modified, the print medium used, ink composition, etc. Each of the border regions beneficially are positioned to abut the interface; however, it is understood that the border region need not abut the interface. The total width of the border regions at an interface should be selected to reduce intercolor bleeding at an interface and minimize the formation of additional printing artifacts. Optimum values for border width can be identified through calibration and image analysis studies. The width of the black border is preferably between 0 and 350 $\mu$m, and the width of the color border is preferably between 0 and 200 $\mu$m is used. Beneficially, for a 300 dpi ink jet the width of the N pixel black border is selected from 0 to 4 pixels, and the width M of the color border is defined to be from 0 to 2 pixels.

Figure 3:
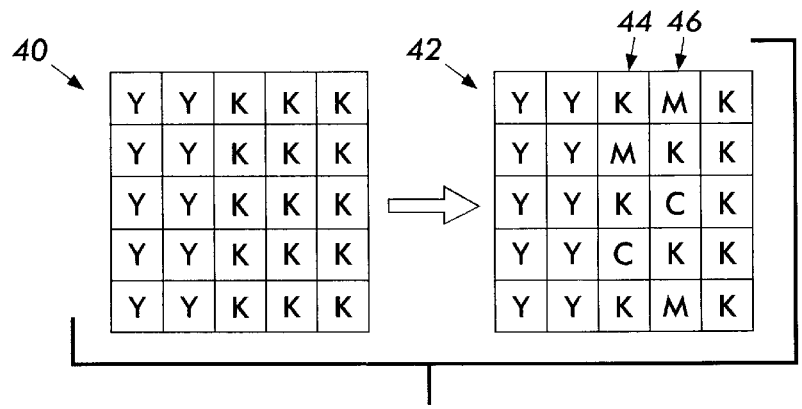
FIG. 3 illustrates an example of a pixel substitution operation.

Steps 36 and 38 modify the pixel pattern within the N-pixel black border and M pixel color border regions, respectively. A number of methods exist to modify the pixels or pixel pattern within the border regions. One method of modifying the pixel pattern within a border region replaces selected pixels with a predetermined combination of separation pixels. The replacement operation effectively turns off the separation pixel this is being replaced and turns on the separation pixel(s) replacing it. The replacement of pixels is sometimes referred to as "substitution." An example of a substitution operation is illustrated in FIG. 3. In FIG. 3, window 40 shows a 5×5 block of composite pixels along a yellow/black interface. Window 42 shows the pixel block of window 40 after a substitution operation wherein within a 2 pixel border (columns 44 and 46) every other pixel in the black separation is turned off and replaced with alternating cyan and magenta pixels in the composite image.

Figure 4:
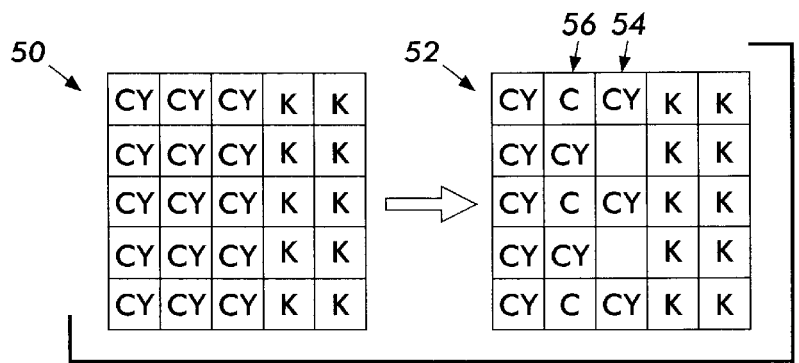
FIGS. 4 and 5 illustrate examples of a pixel thinning operations.

Another method of modifying a pixel pattern removes (turns off) selected pixels in one or more separations from the composite image. This removal of pixels from separations is sometimes referred to as "thinning." FIG. 4 illustrates an example of a thinning operation wherein window 50 is a 5×5 pixel block of a composite pixels along a black/color interface and window 52 shows the same image block after thinning. The thinning operation removes (turns off) all color separation pixels from every other pixel in column 54 and removes yellow separation pixels from every other pixel in column 56.

Figure 5:
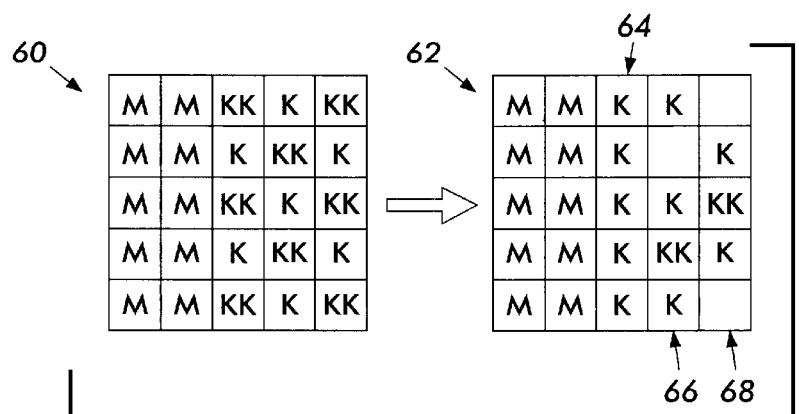

A thinning operation can also be used to reduce the ink coverage in a multiple drop per pixel printer. Briefly, in a multi-drop per pixel printer small ink drops are often used to produce good tone transitions in graphical and pictorial images. However, the size of these drops are not large enough to produce a solid area fill or saturated colors using only one drop per pixel. Thus, the printer typically requires greater than 100% coverage, that is, multiple drops per separation pixel to obtain solid area fill. In FIG. 5 window 60 illustrates a 5×5 pixel area along a black/color interface wherein the black region comprises 150% coverage (i.e., an average of three drops for every two pixels). Window 62 shows the same image area as window 60 after a thinning operation to reduce the drop coverage to approximately 100%, ie., an average of one drop per separation pixel. In window 62, column 64 illustrates a thinning operation that reduces all two drop pixels to one drop pixels. Columns 66 and 68 illustrate a thinning method that removes approximately half of the two drop pixels.

It should be appreciated that a pixel pattern may be modified using a combination of one or more substitution and/or thinning operations. Additionally, it should be appreciated that the thinning and substitution operations need not operate on pre-defined pattern of pixels. For example, the pixel pattern modification may randomly select one pixel of every three for thinning or substitution. Furthermore, when operating to modify the pixel pattern within a selected region, the operation chosen to modify the pixel may vary based upon the position within the region. Varying the pixel modification based upon pixel position within the border allows for a transition within the border region to lessen any perceived dissimilarities between the border region and the interior region. For example, the pixels closest to the interface may be modified using a first substitution operation and the pixels farthest from the interface may be modified using a second substitution operation.

Substitution and thinning operations to modify a pixel pattern can be implemented by defining a pixel modification pattern for each different substitution or thinning operation and adjusting pixels according to the appropriate pixel modification pattern. Each pixel modification pattern can, for example, be represented using an array of ON/OFF (1 or 0) values corresponding to separation pixels being turned on or off, i.e., depositing ink or not, at specific locations in the cyan, magenta, yellow and/or black color planes. The substitution operation adjusts an image pixel by replacing the image pixel with the pixel value from the corresponding pixel in the pixel modification pattern. A thinning operation can adjust an image pixel by performing a logical AND of the image pixel with the corresponding pixel value for an equivalent separation in the pixel modification pattern.

Figure 6:
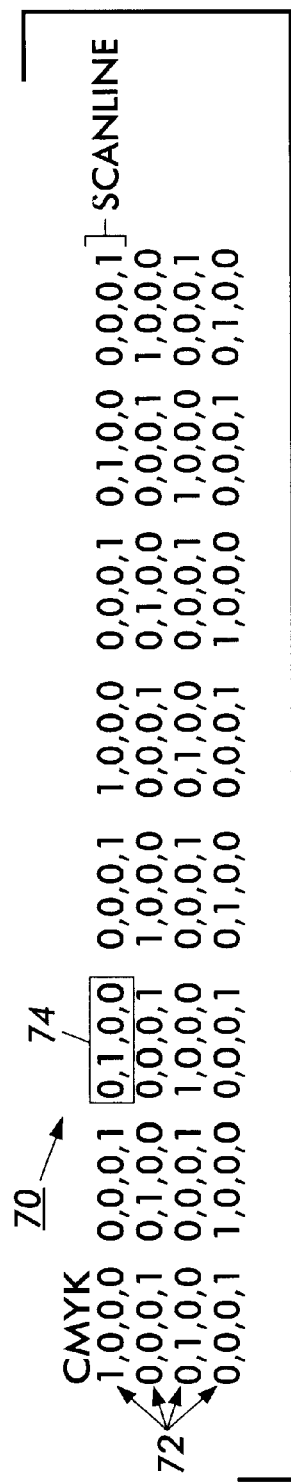
FIG. 6 shows an exemplary bitmap pattern for implementing a substitution operation.

For example, an exemplary pixel modification pattern 70 to implement a substitution operation to replace every other pixel in the black separation with alternating cyan and magenta separation pixels is shown in FIG. 6. Pixel modification pattern 70 comprises four (4) scanlines 72 with eight (8) pixels in each scanline. Modification pattern 70 comprises composite pixels wherein the CMYK data is grouped together for each pixel. For example, pixel 74 indicates that the corresponding separation pixel is turned on in the magenta separation and turned off in the cyan, yellow, and black separations. FIGS. 7–10 illustrate 8×4 modification patterns for each color plane, cyan, magenta, yellow and black, respectively, for modification pattern 70 of FIG. 6. Similarly, an exemplary pixel modification pattern 80 for thinning a pixel pattern to remove black from every pixel and colors in every other pixel is shown in FIG. 11. Modification pattern 80 comprises four (4) scanlines 82 with eight (8) composite pixels of CMYK grouped data in each scanline. FIGS. 12–15 illustrate 8×4 modification patterns for the cyan, magenta, yellow and black separations, respectively, for pixel modification pattern 80 of FIG. 11.

Figure 16:
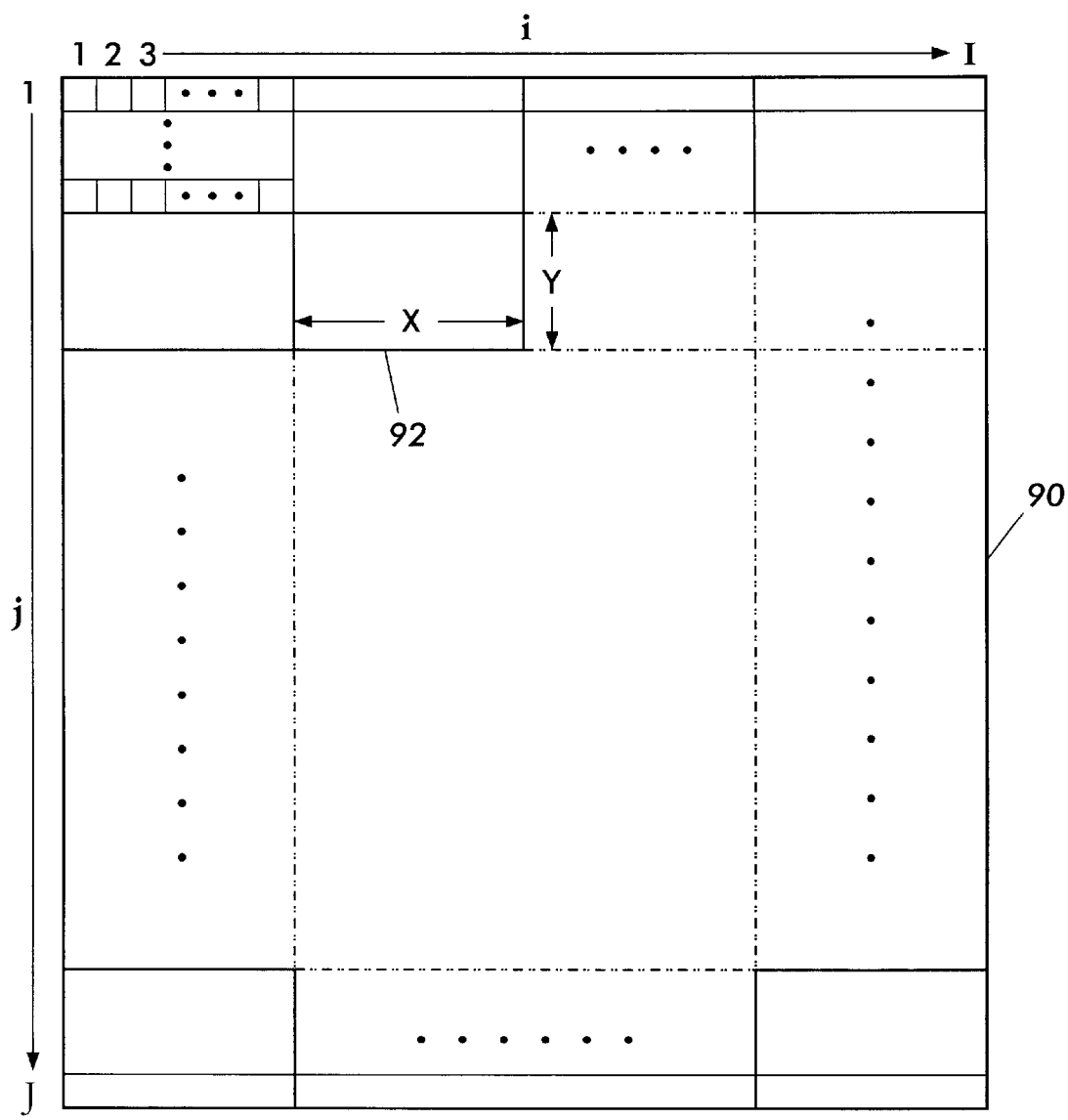
FIG. 16 illustrates an arrangement for tiling bitmaps patterns over color image data.

Pre-defining each of the pixel modification patterns enables the pixel modification patterns (arrays) to be tiled over the image data such that an associated pixel location within each pixel modification pattern can be identified for each pixel within the image data. FIG. 16 illustrates the tiling of modification patterns over image data 90 comprising J scanlines having I pixels in each scanline. Data 90 which may correspond to a composite image or a separation is shown with a plurality of X×Y pixel modification patterns 92 tiled over the image. The corresponding location within a pixel modification pattern 92 can be identified for any pixel p(i, j) as a function of pixel position. Pixels within a black or color border region near an interface can be modified according to the pixel values in the appropriate pixel modification pattern.

Figure 17:
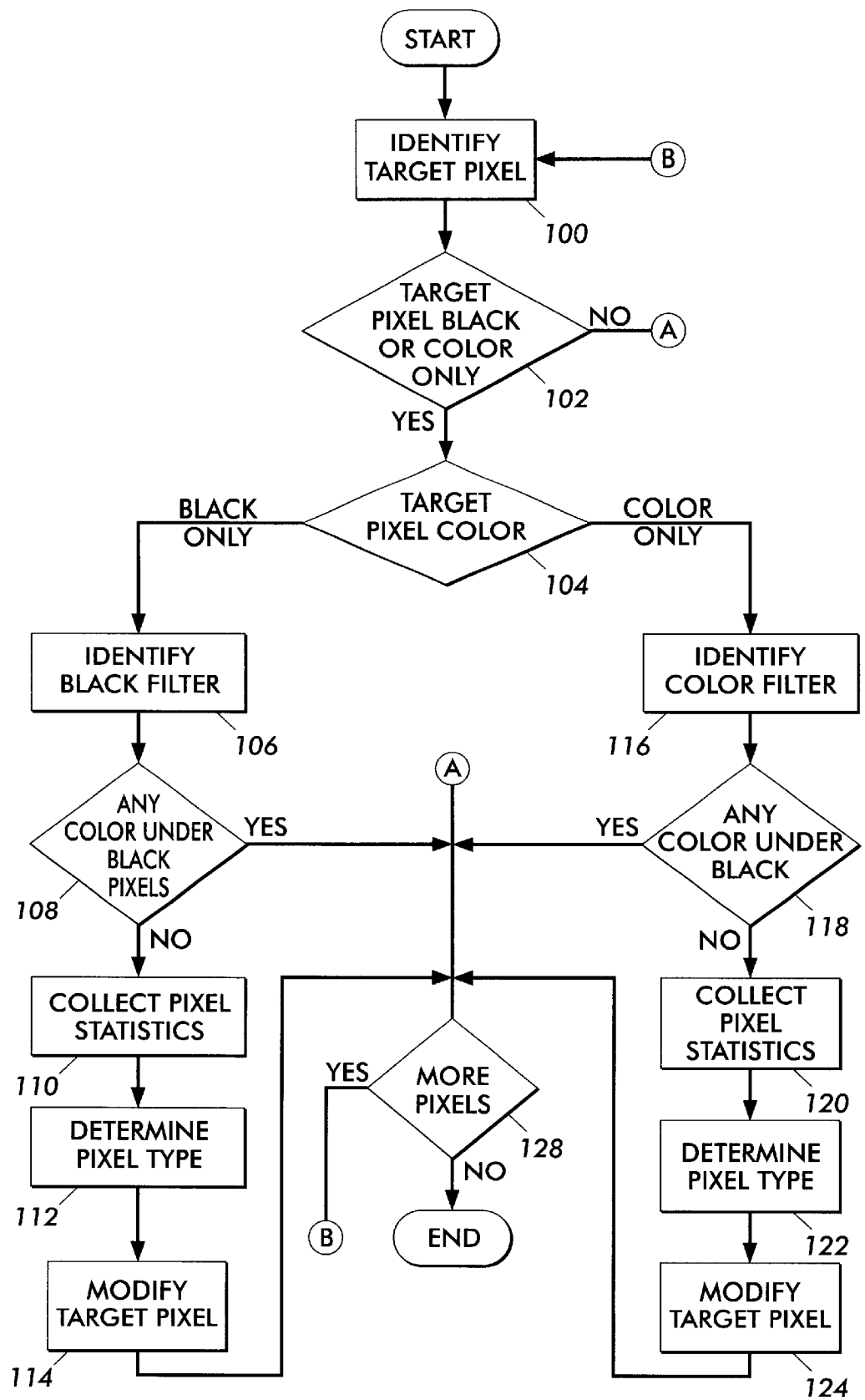
FIG. 17 is a flow chart illustrating various steps in an embodiment of a method for reducing intercolor bleeding according to the concepts of the present invention.

Referring to FIG. 17, there is shown another embodiment of a process to reduce intercolor bleeding in accordance with the present invention. The process of FIG. 17 is shown including an under-color printing (under-printing) operation. The addition of under-printing reduces dry time by adding additional fast-dry color ink to interior regions of solid slow-dry black ink in order to promote absorption of the black ink into the paper. Furthermore, under-printing can reduce streakiness in solid black areas that may occur when slow-dry black ink does not readily absorb and spread into the paper.

Briefly, the process illustrated in FIG. 17 operates on a color corrected, halftoned image. The process passes first window filter including a target pixel therein over a portion of the image, collects statistics for the pixels within the window filter, determines if the pixel is within an N-pixel black border region near a black/color interface based on the collected statistics and modifies the target pixel according to pre-defined rules. A second window filter operating on a second portion of the image including the target pixel may be used to collect statistics for the pixels within the second window filter. The statistics collected from the second window are analyzed to determine if the target pixel is within an M-pixel color border region near a black/color interface and, if so, the target pixel is modified according to a set of pre-defined rules. The reduction of intercolor bleeding operation modifies black pixels that lie within N pixels of an interface with a color pixel and color pixels that lie within a M-pixel border of a black pixel.

The under-printing operation modifies selected interior black pixels to turn on one or more color separation pixels, i.e., print color under black at the selected pixel locations. The concept of "under-printing" or printing color under black is not exact, i.e., a printer may be configured and operated such that some pixels are printed with the color ink deposited under the black ink while other pixels are formed with black ink deposited first and color ink deposited on top. The two operations, intercolor bleeding and under-printing, are described as integrated into a single process, although each can operate independently.

More specifically, the process of FIG. 17 begins with the identification a target pixel p(i,j) for processing in step 100. In step 102, the process determines if the composite pixel for the target pixel is a black only pixel or a color only pixel. A black pixel is a composite pixel in which the separation pixel in the black plane is ON, i.e., at least one drop of black ink will be deposited. A black only pixel is a composite pixel in which the separation pixel in the black plane is ON and the separation pixels for each color plane are OFF. Similarly, in a color only pixel the separation pixel in the black plane is OFF and at least one separation pixel in a color plane is ON. If the target pixel is neither black only or color only, the process determines if there are more pixels within the color image data to process (step 128). If so, the process loops back to step 100 for identification of a new target pixel.

At step 104 the process branches based upon whether the target pixel is a color only pixel or a black only pixel. Each branch performs the same general operations of collecting pixel statistics for the pixels within a window filter, analyzing the collected statistics to determine if the target pixel is within a border region near a black/color interface and processing the target pixel accordingly. Following the branch for black only target pixels, in step 106 the process identifies a black window filter comprising pixels surrounding the target pixel. Beneficially the process uses a square window filter centered on the target pixel. The size of the black window filter can be determined from the width of the border region. For the N-pixel border region in the black area, the size of the black filter is beneficially set to have 2N+1 pixels on a side.

In step 108, the process determines if any pixels within the black window filter have color under black (i.e. print both color and black at any pixel). If any pixel within the window has color under black, no further processing is performed for the target pixel. Step 108 is an optional step in that the process need not be limited to black only, color only or non-printing pixels.

Step 110 collects statistics from the pixels within the black window filter to generate a black window statistics signal B(i,j) for the target pixel p(i,j). The statistics collected are used in subsequent processing (steps 112 and 114) to determine if the target pixel is within a N-pixel border region near a black/color interface and how, if at all, the target pixel should be modified to reduce intercolor bleeding. It should be appreciated that the operation of step 108 can be included in the statistics collected at step 110. In one example, statistics signal B(i,j) identifies the number of black only and color only pixels within the black window filter in step 110. Based upon the number of black only and color only pixels within the black window filter, step 112 identifies if a black/color interface exists and identifies a pixel type for the target pixel. In step 114 an output pixel is generated from the target pixel by modifying the target pixel in accordance with a pre-defined pixel modification pattern based upon the pixel type and whether an interface exists.

One method of identifying a pixel type determines if the number of black pixels within the window is within a predetermined pixel range and, if not, whether the number of black pixels is over or under the predetermined range. For example, the target pixel type may be identified as an interior pixel if the number of black pixels is greater than the predetermined range, a border pixel if the number is within the predetermined pixel range and an isolated pixel if the number is lower than the range. The method can be accomplished, for example, by comparing the number of black only pixels to a series of threshold values and setting the pixel type based upon the result. Additionally, if the number of color only pixels within the window is within a selected range, a black/color interface is presumed to exist. The selected range for identifying a black/color interface may be defined by a predetermined lower threshold, by predetermined upper and lower thresholds or by thresholds dynamically selected based upon the number of black only pixels.

In general, if the target pixel is identified as a border pixel e.g., within the N-pixel border region and a black/color interface is detected within the black window filter, the target pixel is modified to reduce intercolor bleeding according to pixel modification pattern for black border pixels. If the target is within the N-pixel border region and an interface is not detected, the pixel is left untouched. Optionally, if the target pixel is identified as an interior pixel (i.e., within a solid black area but outside the N-pixel border region), the pixel may be modified according to an under-color print pixel modification pattern designed improve image quality in large black areas.

An example of rules for identifying the pixel type of the target pixel based upon the number of black only and color only pixels within the window filter described by the following C-like programming statement:

```
If (#_Black_Only > Border_Full)      Pixel_Type = Interior
If ((Border_Empty ≦ #_Black_Only) and (#_Black_Only ≦
Border_Full))
        Pixel_Type = Border
If (#_Black_Only < Border_Emptyl)    Pixel_Type = Isolated
If (#_Color_Only ≧ ICB_Full)         Bleed = Yes else BLEED = No
```

Wherein N is the number of pixels in the border region; the black window filter size is given by $(2N+1)*(2N+1)$; #_Black_Only is the number of black only pixels within the window; #_Color_Only is the number of color only pixels within the window; Border_Full is the upper threshold for identifying a border pixel and is given by $(2N+1)*(2N+1)-N$; Border_Empty is the lower threshold for identifying a border pixel and is given by $(N+1)*(N+1)$; and ICB_Full is an interface threshold given by N.

General rules for modifying the target pixel based upon the pixel type and existence of an interface can be described by the following C-like programming statement:

```
If (Pixel_Type = Interior) generate output pixel by replacing target pixel
   according to an interior black pixel modification pattern
Else If ((Pixel_Type = Border) and (Bleed = Yes)) generate output pixel
   by replacing target pixel according to a black border modification
   pattern
Else If ((Pixel_Type = Border) and (Bleed = No)) output target pixel
Else If ((Pixel_Type = Isolated) and (Bleed = Yes)) output black only
   target
      pixel
Else output target pixel
```

Turning to the color branch from step 104, the process identifies a color window filter surrounding the target pixel at step 116. As with the black pixel branch, the process beneficially uses a square window filter centered on the target pixel wherein the size of the color window filter is based upon width of the border region within the color area that is modified; however, filters having other sizes and shapes may also be used. For an M-pixel border region the size of a square window filter is beneficially set to have 2M+1 pixels on a side.

Step 118 determines if any pixels within the color window filter have color under black. If any pixel within the window has color under black, no further processing is performed for the target pixel and the process is returned to step 100 for identification of a new target pixel if there are more pixels to be processed (step 128). Step 120 collects statistics for the pixels within the color window filter to generate a color statistics signal $C(i,j)$ for the target pixel $p(i,j)$.

Based upon the statistics collected, step 122 determines if the target pixel is within an M-pixel border region (e.g., a border pixel) near a black/color interface. In general, the target pixel is presumed to be within an M-pixel border region near a black/color interface if the number of color only pixels within the window filter is within a predetermined range (greater than a first threshold and less then a second threshold) and the number of black only pixels exceeds an interface threshold.

An output pixel is generated from the target pixel in step 124. In general, if the target pixel is a border pixel and an interface exists, the target pixel is modified according to a color border pixel pattern. In all other cases, the target pixel is untouched and provided as the output pixel. General rules for determining if the target pixel is a border pixel based upon the number of black only and color only pixels within the window filter can be described by the following C-like programming statement:

```
If ((Border_Empty ≦ #_Color_Only) and (#_Color_Only ≦
Border_Full))
        Pixel_Type = Border
If (#_Black_Only ≧ ICB_Full) Bleed = YES else BLEED = NO
If ((Pixel_Type = Border) and (Bleed = Yes)) generate output pixel by
    thinning target pixel using a color border pixel modification pattern
Else If ((Pixel_Type = Border) and (Bleed = NO)) output target pixel
else output target pixel
```

Wherein M is the number of pixels in the border region; the color window filter size is given by $(2M+1)*(2M+1)$; #_Black_Only is the number of black only pixels within the window; #_Color_Only is the number of color only pixels within the window; Border_Full=$(2M+1)*(2M+1)-M$; Border_Empty=$(M+1)*(M+1)$; and ICB_Full=M.

After completing either branch, the process determines if there are more pixels within the color image data to process (step 128). If so, the process loops back to step 100 for identification of a new target pixel. The process ends when no further pixels need processing.

As discussed above, pre-defined pixel modification patterns comprising an array of ON/OFF (1 or 0) values corresponding to pixels values being turned on or off at specific locations in the color planes can be used to implement thinning and substitution operations. The process of FIG. 17 identifies three pre-defined pixel modification patterns: a color border pixel modification pattern, a black border pixel modification pattern and an interior black pixel modification pattern. The specific pre-defined pixel modification patterns used by the process of FIG. 17 to modify the target pixel may depend, in part, upon the type of printer, print mode (e.g., fast, slow, draft, normal, etc.), type of image (e.g., text, line art, graphic, pictorial), etc. For example, a pixel printer may employ different pixel modification patterns for controlling intercolor bleeding for a draft mode than those used for a normal mode.

For a single drop per pixel printer, a black border pixel pattern to modify pixels in black border regions near black/color interfaces that has been found to provide good results replaces a fraction of the black pixels with magenta pixels and a fraction of the black pixels with cyan pixels. Beneficially, the black border pixel modification pattern replaces approximately 50% of the black pixels with alternating cyan and magenta pixels in a regular pattern. Preferably, the black border pixel modification pattern replaces approximately 25% of the black pixels with cyan pixels and approximately 25% of the black pixels with magenta pixels. An example of such a pixel modification pattern was discussed above and shown in FIGS. 6–10. Another black border pixel modification pattern which has been found to reduce intercolor bleeding replaces a fraction of the black pixels with a regular pattern of cyan, magenta and yellow pixels. A pre-defined interior black pixel modification pattern operates to turn on (add) additional color separation pixels under selected black only pixels. Beneficially, the interior pixel modification pattern underprints a regular pattern of cyan, magenta and yellow pixels. An example of such a pixel modification pattern for printing under approximately 25% of the black pixels is shown in FIG. 18.

A color border pixel modification pattern which has been found to reduce intercolor bleeding thins the color border to remove a fraction of the color pixels within the pixel border. The thinning operation performed on the color border can remove any fraction of the color pixels up to, and including, all of the color pixels. Removing all of the color pixel creates a non-printed area at the interface and is sometimes referred to as etching. Beneficially, the color border pixel modification pattern removes between 25 percent and 75 percent of the color pixels in the pixel border in a regular pattern. An example of such a pixel modification pattern as illustrated in FIGS. 11–15 operates to remove approximately half of the color pixels in a checkerboard pattern in a 2 pixel border. It is understood that other combinations of thinning may be used as well.

For a multiple drop per pixel printer, pixel modification patterns designed to reduce the maximum ink coverage in the border areas have been found to reduce intercolor bleeding. For border pixels in both the black border and color border regions reducing drop coverage by replacing some fraction of the multiple drop pixels with one drop pixels can be used to reduce intercolor bleeding. Optionally, a pixel modification pattern that thins a fraction of the multiple drop pixels within the border region can be used. Beneficially, the pixel patterns reduce ink drop coverage to approximately 100%, i.e., an average of one drop per separation pixel in the black border and color border regions. However, reducing the ink drop coverage to between 100% and 150% in color borders also provides good results. It should be appreciated that other values for border widths and ink coverage may be appropriate based on printer resolution, the inks used, the print medium used, dot scheduling algorithms, etc. The pixel modification patterns necessary to reduce ink drop coverage, either by replacing some multiple drop pixels with one drop pixels or removing some of the multiple drop pixels, depend upon the maximum number of drops per pixel, the maximum drop coverage that can be produced and the pattern in which the multiple drops are distributed.

Figure 19:
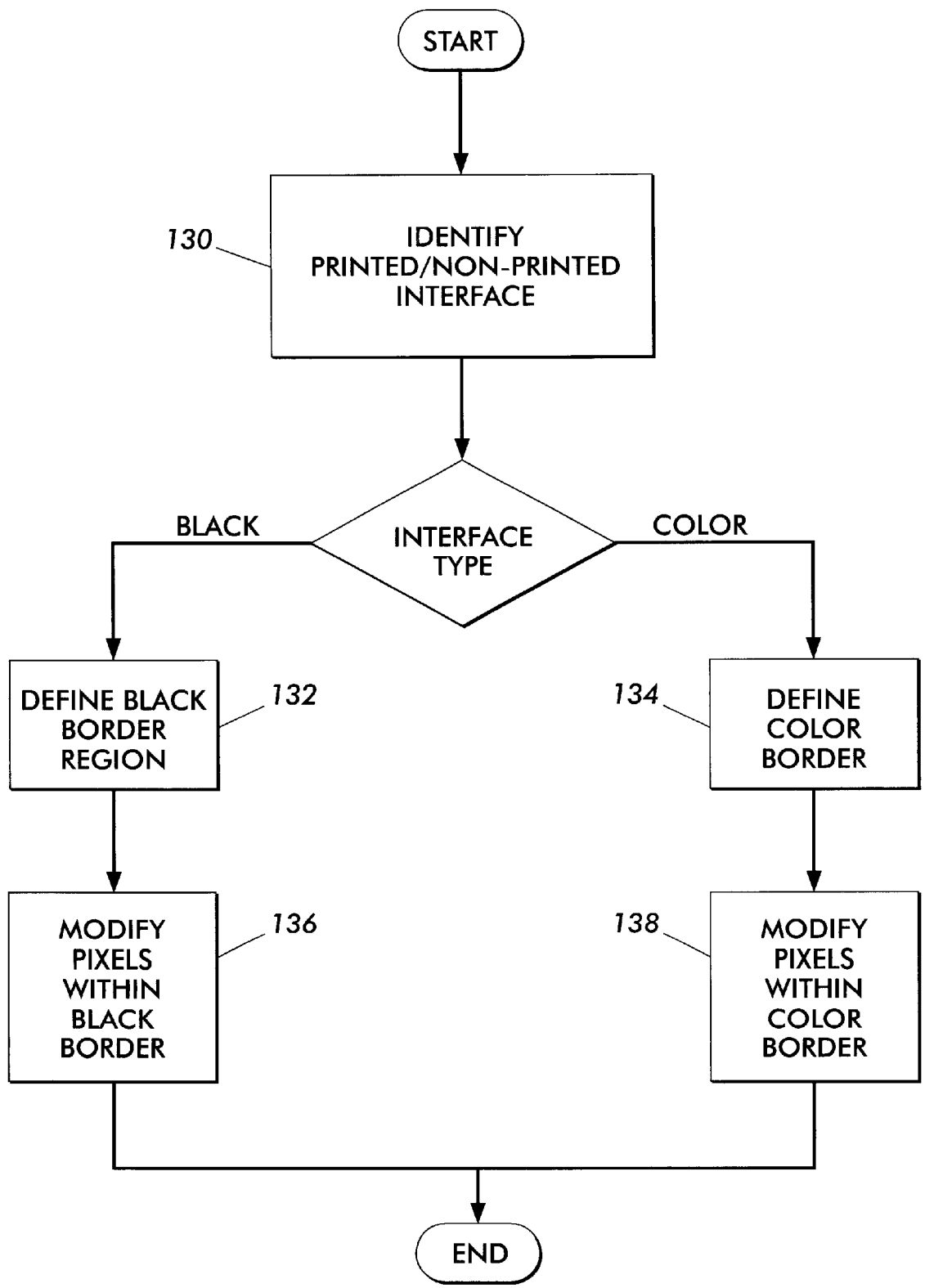
FIG. 19 is a flowchart illustrating the steps of a process to maintain edge quality according to the concepts of the present invention.

It should be appreciated that the above described processes, as illustrated in FIG. 8 or 17, can be modified to identify pixels that are within a border region adjacent a non-printed area. The modified process operates to identify pixels within a border region near a printed/non-printed interface and modify the pixel pattern within the border region of the printed area to sharpen or maintain edge quality. FIG. 19 illustrates a flowchart of a method to maintain edge quality. The modified process identifies interfaces between a printed area and a non-printed area, e.g., between black and non-printed areas and/or between color and non-printed areas (step 130); defines an N-pixel border within a black area near a black/non-printed interface (step 132) and an M-pixel border within a color black area near a black/non-printed interface (step 134), and modifies the pixel pattern within the N-pixel black border and M pixel color border regions (steps 136 and 138, respectively).

Identifying an interface between a printed area and a non-printed area (step 130) is similar to identifying an interface between a black area and a color area and can be accomplished using many of the same techniques including statistics collection, masking, look-up tables, edge detection filters, windowing, etc. Furthermore, the process of FIG. 17 can be varied to identify printed/non-printed interfaces. The adjusted process can include two window filters. Statistics collected from a first window filter are analyzed to determine if a target pixel is within a N-pixel black border region near a black/non-printed interface. Statistics from the second window filter are analyzed to determine if a target pixel is within an M-pixel color border region near a color/non-printed interface. Optionally, the process can use a single filter for identifying both black/non-printed and color/non-printed interfaces.

Briefly, a black window filter generates a black window statistics signal B(i,j) that is analyzed to determine if the target pixel p(i,j) is within a N-pixel border region near a black/non-printed interface. In one example, the target pixel is presumed to be within an N-pixel border region near an interface if the number of black pixels within the window filter is within a predetermined range and the number of color only pixels is less than an interface threshold.

An example of rules for identifying if the target pixel is within a border region near an interface based upon the number pixels within the window filter and modifying the target pixel are described by the following C-like programming statement:

```
If (#_Black_Pixels > Border_Full)    Pixel_Type = Black Interior
If ((Border_Empty ≦ #_Black_Pixels) and (#_Black_Pixels ≦ Border_Full))
        Pixel_Type = Black Border
If (#_Black_Pixels < Border_Empty|) Pixel_Type = Black Isolated
If (#_Color_Pixels < INT_Threshold)        Modify = Yes else
```

-continued

```
                    Modify = No
If ((Pixel_Type = Border) and (Modify = Yes)) generate output pixel by
    replacing target pixel according to a black edge modification pattern
Else output target pixel
```

Wherein N is the number of pixels in the border region; the black window filter size is given by (2N+1)*(2N+1); #_Black_Pixels is the number of black pixels within the window; #_Color_Pixels is the number of color only pixels within the window; Border_Full is the upper threshold for identifying a border pixel and is given by (2N+1)*(2N+1)−N; Border_Empty is the lower threshold for identifying a border pixel and is given by (N+1)*(N+1); and INT_Threshold is an interface threshold given by N.

Similarly, the color window filter generates a color statistics signal C(i,j) that is analyzed to determine if the target pixel p(i,j) is within a M-pixel border region near a color/non-printed interface. In general, the target pixel is presumed to be within an M-pixel border region near an interface if the number of color only pixels within the window filter is within a predetermined range and the number of black pixels is less than an interface threshold. An example of rules for identifying if the target pixel is within a border region near an interface based upon the number pixels within the window filter and modifying the target pixel are described by the following C-like programming statement:

```
If (#_Color_Pixels > Border_Full)      Pixel_Type = Color Interior
If ((Border_Empty ≦ #_Color_Pixels) and (#_Color_Pixels ≦
Border_Full))
          Pixel_Type = Color Border
If (#_Color_Pixels < Border_Emptyl)  Pixel_Type = Color Isolated
If (#_Black_Pixels < INT_Threshold)  Modify = Yes else Modify =
                                       No
If ((Pixel_Type = Border) and (Modify = Yes)) generate output pixel by
    replacing target pixel according to a color edge modification pattern
Else output target pixel
```

Wherein M is the number of pixels in the border region; the color window filter size is given by (2M+1)*(2M+1); #_Color_Pixels is the number of color only pixels within the window; #_Black_Pixels is the number of black pixels within the window; Border_Full is the upper threshold for identifying a border pixel and is given by (2M+1)*(2M+1)−M; Border_Empty is the lower threshold for identifying a border pixel and is given by (M+1)*(M+1); and INT_Threshold is an interface threshold given by M.

Optionally, when collecting statistics the pixels within a window filter and identifying a pixel type based upon the collected statistics, the process may compare the number of printing and non-printing pixels. For example, if the target pixel is a black only printed pixel, the collected statistics may identify the number of black only pixels and the number of non-printed pixels within the window filter. Rules for identifying if the target pixel is a border pixel based upon the number of black only and non-printed pixels within the window filter can be described by the following C-like programming statement:

```
If ((Border_Empty ≦ #_Black_Pixels) and (#_Black_Pixels ≦
Border_Full))
          Pixel_Type = Border
If (#_Non_Prinited ≧ INT_Threshold)    Modify = YES else
Modify = NO
```

The width of the border regions near the printed/non-printed interface (steps 132 and 134) should be selected to maintain/improve edge quality without introducing printing artifacts that would reduce image quality. When defining the width of the border regions consideration may be given to such factors as the type of image (e.g., text, line art, graphics, pictorial, etc.), how the pixel pattern will be modified, the print medium, ink composition, etc. Optimum values for border width can be identified through calibration and image analysis studies. The width of the black border is preferably between 0 and 520 μm, and the width of the color border is preferably between 0 and 200 μm. Beneficially, for a 300 dpi ink jet the width N of a border region within a black area is defined to be between 0 to 6 pixels, and the width M of the color border is selected to be from 0 to 2 pixels.

At steps 136 and 138 the pixel pattern within the N-pixel and M-pixel borders are modified to maintain edge quality. As with the modification of border regions near a black/color interface, the pixel modification pattern used may vary based on factors such as the printer type (single drop, multi-drop), print mode (e.g., fast, slow, draft, normal, etc.), type of image (e.g., text, line art, graphic, pictorial), etc. For a single drop per pixel printer, removing all color pixels under black within a black border region near black/non-printed interface has been found to improve/maintain edge quality of the black area. Briefly reviewing, under-printing a slow-dry black ink with a fast-dry color ink provide improved dry time and a reduction in perceived banding or streaks in large black areas. However, when fast dry ink is printed under a black area, the edges of the black area adjoining a non-printed area are poorly defined and often appear ragged. Thus, to maintain edge quality of a black area next to a non-printed area, a pixel modification pattern may operate to remove (thin) all the color under black for pixels within an M-pixel border region within a black area bordering the non-printed area. In addition to removing color under black in a border region, increasing the coverage by printing multiple drops at a pixel can be used to improve edge quality.

In a multi-drop per pixel printer, edge quality of both black and color areas printed adjacent to non-printed areas can be improved if all pixels within a border region have the same number of drops per pixel. For example, a multi-drop printer may limit the maximum coverage in solid black areas to 150% to prevent streakiness or pooling as well as to reduce dry-time. However, with 150% coverage some pixel locations receive two drops while other receive only one drop. The one-drop and two-drop pixels spread differently into the print medium, producing a ragged edge. Thus, a pixel modification pattern that replaces all or substantially all one drop pixels with two drop pixels (increasing coverage to 200%) provides good results. Alternatively, replacing all two drop pixels with one drop pixels (decreasing coverage to 100%) can also be used to improve edge quality.

Figure 20:
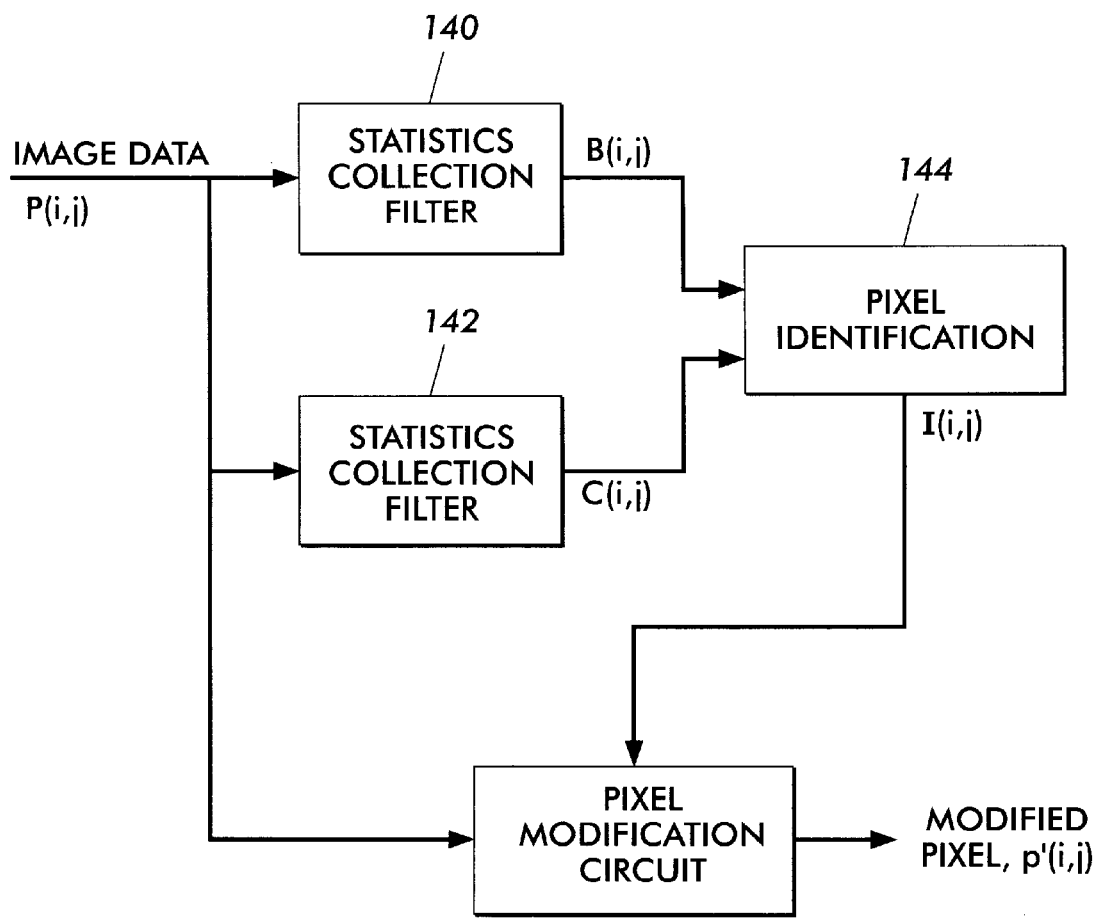
FIG. 20 is a block diagram of a circuit for reducing intercolor bleeding in accordance with the present invention.

Referring now to FIG. 20, there is shown a block diagram of a circuit, according to one embodiment of the invention, for determining whether a pixel is within a border region near an interface and modifying the pixel to reduce intercolor bleeding or improve edge quality. As illustrated in FIG. 20, image data is fed to a first statistics collection filter 140 which collects statistics for a target pixel p(i,j) and the neighboring pixels within a black border window and produces a black border statistics signal B(i,j). The image data is also fed to a second statistics collection filter 142 which collects statistics for the pixels within a color border window and produces a color border statistics signal C(i,j). The statistics collected by filter 140 and filter 142 may identify the number of black only pixels, number of color only pixels, number of non-printed pixels, color under black pixels, etc.

The black border and color border statistics signals are fed to a pixel identification circuit 144. Pixel identification circuit 144 analyzes the statistics signals produce a pixel identification signal l(i,j) for the target pixel p(i,j). The pixel identification signal l(i,j) identifies a pixel type for the target pixel. For example, circuit 144 may analyze the target pixel to determine if the target pixel is a color or black pixel, if the target pixel is within an N-pixel or M-pixel border region and produce an identification signal that indicates the target pixel is one of a black interior pixel, a black border pixel, a color border pixel, an isolated pixel, etc. The pixel identification signal l(i,j) is fed to a pixel modification circuit 146 operating on the target pixel p(i,j). Depending upon the pixel identification signal, the modification circuit either allows the target pixel p(i,j) to pass through unprocessed or modifies the pixel data associated with the target pixel according to an appropriate pixel modification pattern.

One skilled in the art would understand that the filters and circuits described above can embody or be implemented using a general or special purpose computer, a programmed microprocessor or micro controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Furthermore, specific algorithms may be accomplished using software in combination with specific hardware. In general, any device capable of implementing a finite state machine that is in turn capable of implementing a process described above can be used to realize the associated filter or circuit.

The N-pixel and M-pixel border widths, the border threshold values and the interface threshold values discussed above and utilized in determining the pixel type and whether to modify the pixel as well as the various pixel modification patterns can be either preset as default values or generated during a calibration process. Furthermore, several sets of parameter values for the border widths and threshold values and several different pixel modification patterns can be stored and automatically or manually selected for specified print modes or image types. For example, faster print modes with fewer number of passes might require intercolor bleed control processing to reduce dry time so that it is comparable to the print speed and reduce the higher intercolor bleeding usually associated with faster printing. On the other hand, lower speed printing using more passes may not require such processing.

As indicated above, parameters such as pixel modification patterns and border widths used for intercolor bleed control, under-printing or edge quality processing may be set (varied) based upon print mode (e.g., draft, normal, high speed, low speed, etc.) and/or the image type (e.g., text, line art, graphics pictorial, etc.). That is, the processes for reducing intercolor bleeding, under-printing and maintaining edge quality can be most effectively employed if they are applied selectively to different objects within a document based upon the image type and print mode. For example, a process may be designed that provides a substantial reduction of intercolor bleeding when applied to graphics objects but produces printing artifacts when applied to pictorial objects.

To address this situation, processes for reducing intercolor bleeding (ie., adjusting borders at black/color interfaces), under-printing and/or maintaining edge quality (i.e., adjusting borders at printed/non-printed interfaces) can be applied on an object oriented basis. That is, objects in a document can be classified as one of several different types or classes such as text, line art, graphics, grayscale or pictorial. Each of the different classes can be assigned preferred intercolor bleed control, under-printing and edge quality processes. Moreover, analysis of the print quality obtained by application of various processes to different object types on different print mediums may be used to identify/describe various object classes. For example, consider black text on a non-printed (white) background. Small text generally has a small amount of ink and dries relatively quickly. As the text becomes larger, however, a greater amount of ink is used and the drying time increases. Thus, text below a certain point size may not benefit (and may be harmed) from processing such as under-printing to reduce dry-time. On the other hand, text above a threshold point size may benefit from under-printing processing to reduce dry-time to acceptable levels thereby improving print quality.

A similar analysis may be performed for black text on a color (printed) background. In general, intercolor bleeding increases when there is a greater amount of black ink available to bleed into colors. Thus, intercolor bleeding control and under-printing processes can be effective in reducing bleeding and improving print quality for larger point size text. On the other hand, the use of intercolor bleeding control and under-printing processing on small text printed on a color background can produce visual defects such as lowered optical density, colored appearance, etc. Moreover, due to lower ink content black text below a threshold point size will generate a minimal amount of bleeding. Therefore, it may be preferable to eliminate the intercolor bleeding control and under-printing processing for such text. Moreover, similar reasoning can be applied to lines, table borders, line art, etc. printed on non-printed (white) backgrounds and on printed (color) backgrounds. That is, thin lines (below a threshold width or point size) may not require intercolor bleeding control and under-printing processing and may, in fact, produce a better visual appearance without such processing. Likewise, broader lines would generally benefit from intercolor bleeding control and under-printing processing by improving dry-time and reducing intercolor bleeding.

The above analysis of print quality may be used to identify and support several combinations of object classes. In one embodiment, each object in a document may be classified into one of three classes: (a) black text below a selected font or point size threshold on an non-printed (white) background; (b) graphics objects including line art, black text larger than a second font or point size threshold on a printed (color) background and black text greater than a selected threshold on an non-printed background and (c) pictorial objects. The processes described above for reducing intercolor bleeding, under-printing and maintaining edge quality may be applied to objects of class (b) with objects of classes (a) and (c) receiving different pixel management processing. It should be appreciated that different font and point size threshold parameters may apply for different classes as well as within a class. For example, a first size threshold may be chosen for black text on a non-printed (white) background and a different size threshold may apply for black text on a printed (color) background.

Alternatively, the above analysis of print quality may lead to the following three classes: (a) text and line art smaller than a selected point size threshold; (b) graphics objects including line art and text having a point size greater than a selected threshold and (c) pictorial objects. Additionally, objects may be separated into "conventional" classes of text objects, graphics objects and pictorial objects wherein intercolor bleed control, under-printing and/or edge quality processing may be applied to each text and graphics object based on the point or font size and background type. Once again, it is understood that different size thresholds may be chosen for an object type based on whether the object is on a printed or non-printed background as well as the object type (e.g., text, line art, graphics). Furthermore, those skilled in the art will recognize that other object types may also be defined.

Figure 21:
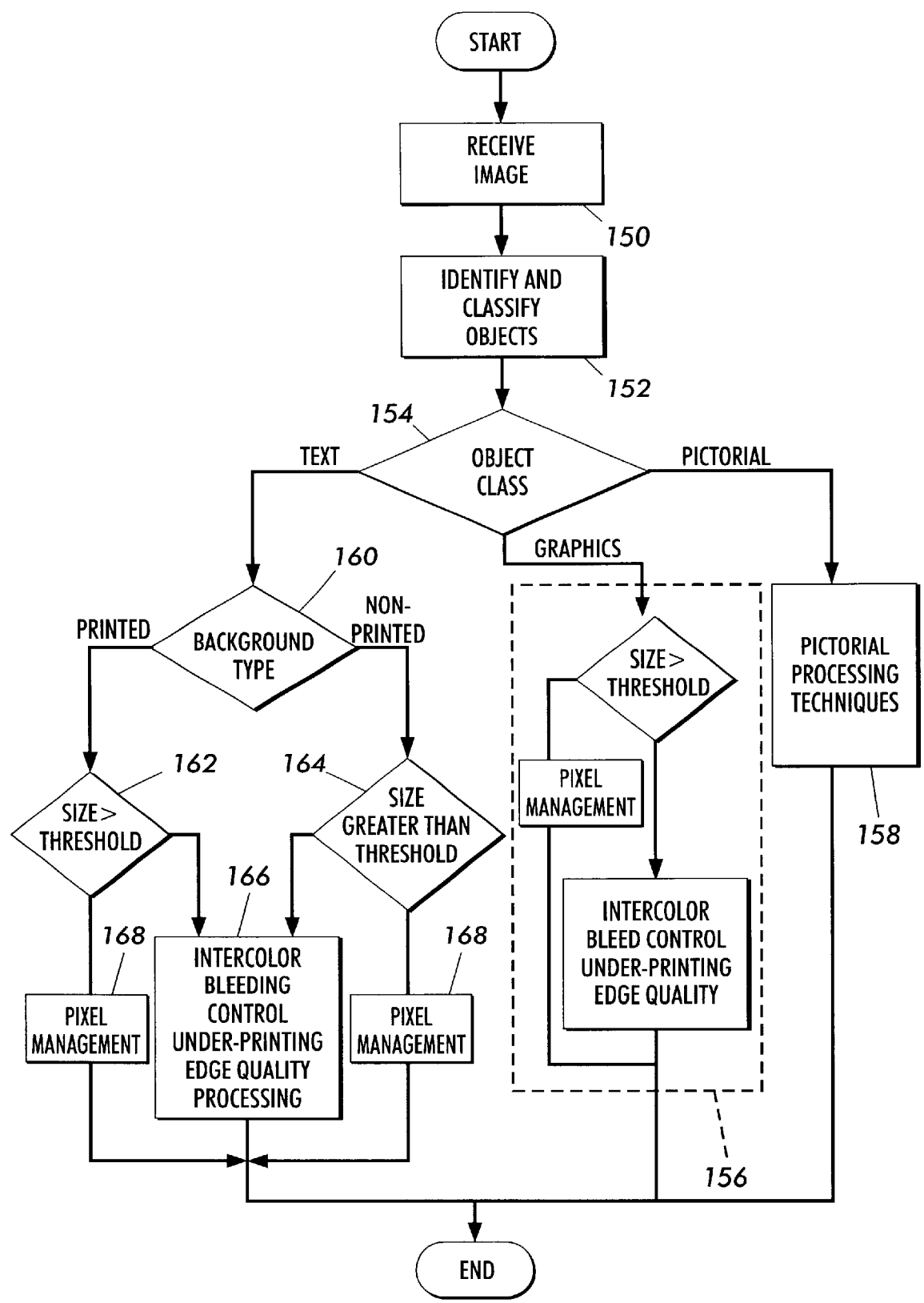
FIG. 21 is a flowchart showing a process for differentially processing objects according to the concepts of the present invention.

To selectively apply intercolor bleed control, under-printing and/or edge quality processing on an object oriented basis, one embodiment of the present invention carries out a process as illustrated in FIG. 21. The process of FIG. 21 operates to identify objects within a document image, classify the objects into one of several predefined image types. Each of the different object types can be processed using a preferred set of processing techniques. More specifically, document image data which may include ASCII data, bitmapped image data (including color corrected, halftoned data), geometric data, graphics primitives, page description language, etc. as well as any combination thereof is received in step 150.

At step 152, the document image data is analyzed to identify and classify objects within the document image that are to be rendered differentially so as to result in an output image that is more desirable than the unaltered input image. Toward this end, step 152 identifies three types of objects in the image: text, graphics and pictorial. It is understood that hybrids of these three basic classes, or entirely different or additional/more specific classes, may be used depending on the particular desired application. Objects within an image may be identified and classified from an analysis of the image data. The format of the image data received may be used to identify objects. That is, text objects may be bitmapped data or ASCII text characters, while pictorial objects may be in the form of a multibit per pixel raster image. Graphics objects may be described as graphics primitives or geometric data.

Similarly, for image data in a page description language, analysis of the image data can be used to identify graphics objects on the page and their attributes, such as size, border color, fill color, line thickness, and the like. The analysis can also provide information on how and where text is used on the page, as well as the text attributes, such as text size, color, spacing and whether the text is next to, or on top of colored regions. Moreover, the identification and classification of objects within an image can be accomplished using any number of well know segmentation classification functions including, but not limited to, auto-correlation, frequency analysis, pattern or template matching, peak/valley detection, histograms, etc. Furthermore, techniques for classifying image data, such as those taught by Fan et al. in U.S. Pat. No. 5,850,474 and by Revankar et al. in U.S. Pat. No. 5,767,978, can be used to identify objects within the document image.

In the second stage, the objects classified as text objects, graphics objects or pictorial objects are processed according to the selected or default processing techniques most appropriate for processing a text, graphics or picture image region. For example, text objects can be printed according to a first set of pixel management (e.g., intercolor bleed control, under-printing and edge quality processing) processing parameters, graphics objects according to a second set of pixel management processing parameters, and pictorial objects according to a third set of pixel management processing parameters.

At step 154, text objects are directed to text processing techniques as illustrated with steps 160–168. If the text is on a printed (color) background (step 160), and is greater than a predetermined font or point size threshold (step 162), then intercolor bleeding control, under-printing and edge quality processing is performed (step 166). Similarly, if the text object has a non-printed (white) background (step 160), and is greater than a predetermined point size threshold (step 164), a first pixel management process which may include intercolor bleeding control, under-printing and edge quality processing optimized for large text objects is performed (step 166). On the other hand, for text objects less than the predetermined size thresholds at steps 162 and 164, an alternative pixel management process optimized for small text is performed (step 168). The alternative pixel management process of step 168 may include any combination of intercolor bleed control, under-printing processing and edge quality processing such as edge quality processing without intercolor bleed control or under-printing processing. Likewise, the pixel management processing of step 168 may not include any intercolor bleed control, under-printing processing or edge quality processing.

The processing techniques applied to graphics objects (step 156) are similar to those applied to text objects. That is, in addition to image processing functions (e.g., color matching or correction, halftoning, etc.), graphics objects that are greater than a predefined graphics size threshold receive a first set of graphics pixel management processing that may include intercolor bleeding control, under-printing and edge quality processing while the graphics objects that are less than the graphics size threshold receive a second set of graphics pixel management processing. Finally, in addition to image processing functions (e.g., color matching or correction, halftoning, etc.), pictorial objects receive a set of pictorial pixel management functions that may include intercolor bleeding control, under-printing and/or edge quality processing optimized for pictorial objects.

As discussed above, any manner of differentiating image objects that will result in an improved quality image can be used. Thus, in certain embodiments of the system and method of the present invention, identification of images as text, graphics or pictures may be eliminated in favor of a system involving different object classes. Such a system may allow greater latitude in differentially processing images than one based on "traditional" image classes like text, graphics and pictorial objects. For example, in the process of FIG. 21 alternative classes (e.g., class one, class two and class three) may be substituted for text objects, graphics objects and pictorial objects, respectively. Wherein class one may be defined to include black text and line art on an non-printed (white) background smaller than a selected font or point size. Class two may be defined to include graphics as well as text and line art on a color background larger than a selected point size and text and line art on an non-printed background having a font or point size greater than a selected threshold. Class three would maintain pictorial objects. As previously described, classes one and three may not need intercolor bleeding control and under-printing processing applied thereto, while class two can benefit from receiving intercolor bleed control, under-printing and edge quality processing.

Figure 22:
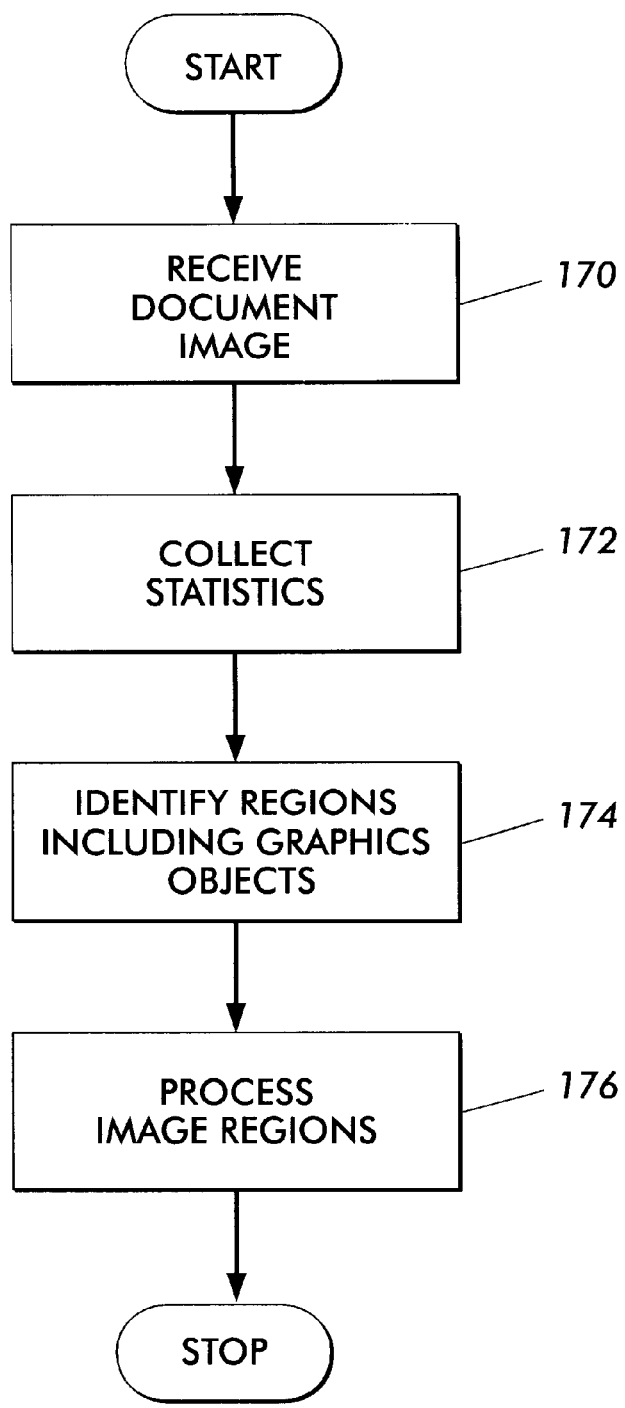
FIG. 22 is a flowchart showing an embodiment of process for differentially processing objects in a document image.

Referring to FIG. 22, there is shown a flowchart illustrating another embodiment of the present invention for differentially processing objects within a document image. The process of FIG. 22 operates to identify regions within the document image that include at least one of a graphics object, line art or text on a printed or background larger than a first threshold selected font or point size or line art or text on a non-printed background having a font or point size greater than a second threshold.

The process of FIG. 22 begins with the receipt of a document image which may include any combination of text, graphics and/or pictorial objects (step 170). It is understood that the objects may or may not have been previously identified and labeled as text, graphics or pictorials. The document image comprises a one or more document regions each of which can be defined in terms of number of pixels, number scanlines, bytes of image data, blocks of image data, etc. The regions comprising the document image need not be equal in size and can be of any size up to and including the entire document. Moreover, the regions can be predefined or identified dynamically as the document image data is received. For example, in a Microsoft® Windows® environment an image may printed using a technique that divides the image into printer bands and processes each band. With such a technique, each band processed which can be identified by the driver by a starting location, width and height can be considered as an image region.

At step 172, statistics for each image region are collected. At a minimum, the statistics collected will be used to identify image regions that include at least a portion of one of a graphics object, line art or text on a color background larger than the first font or point size and line art or text on an non-printed background greater than the second font or point size threshold. The statistics collected may include segmentation data, data describing the type of geometric objects on the page and their attributes, such as size, border color, fill color, line thickness, and the like. Other statistics may include information on how text is used on the page, as well as the text attributes, such as text size, color and spacing and whether the text is next to, or on top of printed (color) areas. Moreover, step 172 may identify within a page description language instructions for generating a graphics object such as a graphical data interface call in a Windows® environment. Additional statistics collected in step 172 may include identifying black areas that are adjacent to color areas, which objects are black only or color only objects, and which objects have a mixture of black and color.

At step 174, the process identifies whether each image region within the document image which may be classified as including a graphics object, line art or text on a color background larger than the first font or point size and line art or text on an non-printed background greater than the second font or point size threshold. Additionally, step 174 may identify those regions that include other types of objects as well (i.e., regions including text below a size threshold on a non-printed background or including pictorials). However, for intercolor bleeding control, under-printing and edge quality processing step 174 need not specifically identify any small text or pictorial objects or regions including them.

At step 176, image regions identified in step 174 as including a graphics object, line art or text on a color background larger than the first font or point size and/or line art or text on an non-printed background greater than the second font or point size threshold are processed with a first pixel management process that includes intercolor bleeding control, under-printing and/or edge quality processing optimized for such object types. Regions that do not include at least one of a graphics object, line art or text on a color background larger than the first font or point size and/or line art or text on an non-printed background greater than the second font or point size threshold are processed with a second pixel management process. The second pixel management process may comprise any combination of intercolor bleed control, under-printing processing and edge quality processing. Alternatively, the second pixel management processes may simply include operations to cause a printer to generate an output document without performing intercolor bleed control, under-printing processing or edge quality processing.

Figure 23:
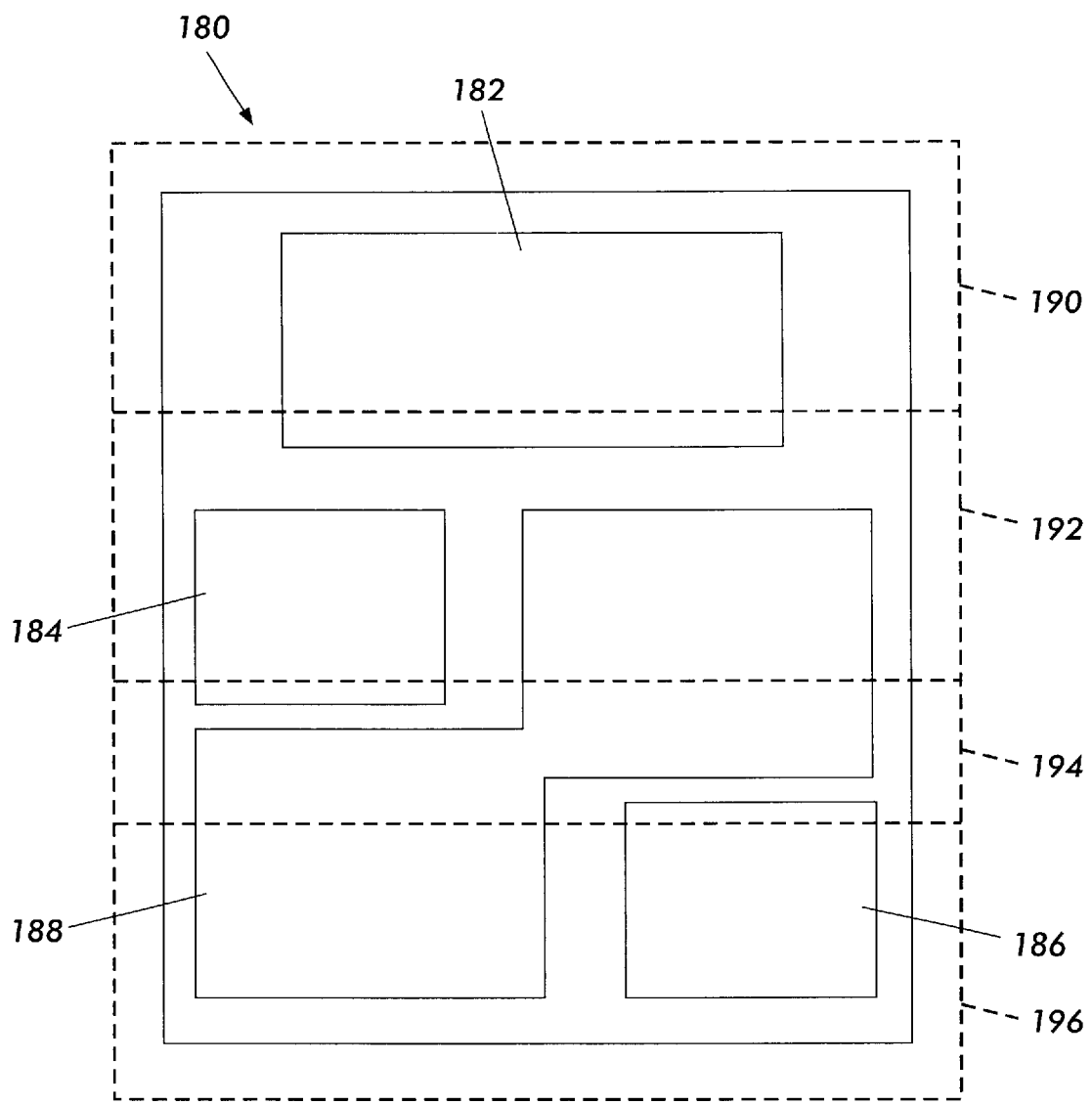
FIG. 23 illustrates a document image comprising large and small text, graphics objects and a pictorial object.

The following description in conjunction with FIG. 23 provides one example of the process illustrated in FIG. 22 for differentially processing objects within a document image. FIG. 23 illustrates a sample document image 180 comprising area 182 of large text, a graphics object 184 such as a bar chart, a pictorial object 186 and several areas 188 of small text. Document 180 is further divided into several image regions 190–196. In processing document image 180, the image data corresponding to image region 190 is received and statistics are collected the region are collected. Based upon the collected statistics, the process determines that region 190 includes a large text and classifies region 190 as including a graphics object, line art or text on a printed background larger than the first font or point size and line art or text on an non-printed background greater than the second font or point size threshold. Based upon this classification, the image data corresponding to region 190 is processed according to a first pixel management process that includes at least one of intercolor bleed control, under-printing processing and edge quality processing. For example, the image data within region 190 may be processed according to the method described above with reference to FIG. 17.

The process similarly collects statistics for the image data corresponding to regions 192, 194 and 196. From the collected statistics, the process classifies regions 192 and 194 as including a graphics object, line art or text on a printed background and/or line art or text on an non-printed background. Based upon this classification, the image data within these regions, including the small text and pictorial image data are processed according to a first pixel management process. Region 196, on the other hand, would not be so classified, and thus, would be processed according to a second pixel management process which may perform any combination, including none, of intercolor bleed control, under-printing processing or edge quality processing.

It should be appreciated that the above process of FIG. 22 is not limited to the binary classification described above. For example, image regions may be classified into one of the following three classes: class 1—regions including a graphics object or large text/line art; class 2—regions including both a pictorial object and one of a graphics object or large text/line art; and class 3—regions not including a graphics objects, large text/line art.

While the present invention has been described with reference to various embodiments disclosed herein, it is not to be confined to the details set forth above, but it is intended to cover such modifications or changes as made within the scope of the attached claims.

What is claimed is:

1. A method of processing document image data for printing an image on a receiving medium, comprising:

receiving document image data, the image data comprising at least two elements from the group of text objects, graphic objects and pictorial objects;

classifying each element in the image data as being one of a text object, a graphic object, or a pictorial object;

printing the image data corresponding to elements classified as a text object according to a set of text processing parameters, the text processing parameters including processing text smaller than a text threshold size according to a set of small text processing parameters and processing text greater than the text threshold size according to a set of large text processing parameters, wherein the set of text processing parameters includes processing text on a printed background that is greater than a text-on-color threshold size according to the set of large text processing parameters;

printing the image data corresponding to elements classified as a graphics object according to a set of graphics processing parameters; and printing the image data corresponding to elements classified as a pictorial object according to a set of pictorial processing parameters.

2. The method according to claim 1, wherein the set of graphics processing parameters further comprises processing graphics objects smaller than a graphics threshold size according to a set of small graphics processing parameters and processing graphics objects greater than the graphics threshold size according to a set of large graphics processing parameters.

3. The method of claim 2, wherein the set of large graphics processing parameters comprises at least one process selected from intercolor bleed control, under-printing and edge quality processes.

4. The method of claim 3, wherein the set of small graphics processing parameters comprises edge quality processing.

5. The method according to claim 1, wherein the set of text processing parameters further comprises processing text on a non-printed background that is greater than a text-on-white threshold size according to the set of large text processing parameters.

6. The method of claim 5, wherein the set of large text processing parameters comprises at least one process selected from intercolor bleed control, under-printing and edge quality processes.

7. The method of claim 6, wherein the set of small text processing parameters comprises edge quality processing.

8. The method of claim 5, wherein the set of large text processing parameters comprises intercolor bleeding control processing and edge quality processing.

9. The method of claim 8, wherein the intercolor bleed control processing comprises modifying pixels within a black border near a black/color interface according to a black bitmap modification pattern.

10. The method of claim 9, wherein the intercolor bleed control processing comprises modifying pixels within a color border near a black/color interface according lo a color bitmap modification pattern.

11. A method of processing document image data to generate an image on a receiving medium, comprising:

receiving image data comprising one or more image regions, wherein at least one of the image regions includes a plurality of image types;

determining for each image region including a plurality of image types whether the region includes any image data corresponding to a first image type, the first pixel management process including at least one process from the group of intercolor bleeding control processing, under-printing processing and edge quality processing, wherein the intercolor bleed control processing comprises modifying pixels within a color border near a black/color interface according to a color bitmap modification pattern;

printing image regions including image data corresponding to the first image type according to a first pixel management process; and printing image regions not including image data corresponding to the first image type according to a second pixel management process.

12. The method of claim 11, wherein the intercolor bleed control processing further comprises modifying pixels within a black border near a black/color interface according to a black bitmap modification pattern.

* * * * *